United States Patent

Meyer et al.

Patent Number: 5,830,944
Date of Patent: Nov. 3, 1998

[54] PREPARATION OF POLYMERIC POLYESTEROLS

[75] Inventors: Baerbel Meyer, Lauta; Gerd Mueller-Hagen, Ludwigshafen; Bernd Guettes, Sallgast, all of Germany

[73] Assignee: BASF Aktiengesellschaft, Germany

[21] Appl. No.: 852,707

[22] Filed: May 7, 1997

Related U.S. Application Data

[63] Continuation of Ser. No. 482,153, Jun. 8, 1995, abandoned, which is a continuation-in-part of Ser. No. 221,117, Mar. 31, 1994, abandoned.

[51] Int. Cl.$^6$ ..................................................... C08L 67/02
[52] U.S. Cl. ............................. 525/28; 525/131; 525/440; 525/445
[58] Field of Search .............................. 525/28, 440, 131, 525/445

[56] References Cited

U.S. PATENT DOCUMENTS

| | | |
|---|---|---|
| 3,304,273 | 2/1967 | Stamberger . |
| 3,418,354 | 12/1968 | Wheeler, Jr. . |
| 3,875,258 | 4/1975 | Patton, Jr. et al. . |
| 3,883,351 | 5/1975 | Lewis . |
| 4,357,430 | 11/1982 | VanCleve . |
| 4,454,255 | 6/1984 | Ramlow et al. . |
| 4,625,589 | 12/1986 | Nishikawa et al. . |
| 4,723,026 | 2/1988 | Cloetens et al. . |
| 4,831,076 | 5/1989 | Lidy et al. . |
| 4,883,832 | 11/1989 | Cloetens et al. . |
| 4,931,483 | 6/1990 | Matsuoka ................................ 521/137 |
| 5,272,204 | 12/1993 | Akimoto ................................. 524/700 |

FOREIGN PATENT DOCUMENTS

| | | |
|---|---|---|
| 0 250 351 A2 | 12/1987 | European Pat. Off. . |
| 0 495 551 A2 | 7/1992 | European Pat. Off. . |
| 1 152 536 | 8/1963 | Germany . |
| 8801679 | 9/1987 | Spain . |
| 1321679 | 6/1973 | United Kingdom . |
| 1472549 | 5/1977 | United Kingdom . |
| 1477333 | 6/1977 | United Kingdom . |
| 2 053 933 | 2/1981 | United Kingdom . |

OTHER PUBLICATIONS

New Polymeric Polyesters and Their Application in Microcellular Elastomers for Shoe Soles, J.M. Monso et al.

*Primary Examiner*—Patricia A. Short
*Attorney, Agent, or Firm*—James J. Drake

[57] ABSTRACT

Polymeric polyesterols are prepared by in-situ polymerization of ethylenically unsaturated monomers in polyesterols in the presence of prepolymers made from polyesterols and isocyanates.

4 Claims, No Drawings

PREPARATION OF POLYMERIC POLYESTEROLS

This is a continuation of application Ser. No. 08/482,153 filed Jun. 8, 1995, now abandoned which is a continuation in part of application Ser. No. 08/221,117 filed Mar. 31, 1994, now abandoned The present invention relates to a process for the preparation of polymeric polyols using polyester-polyols as the base polyols, and to products prepared by this process.

The preparation of polyols in which vinyl polymers are dispersed has been known for some time and has been described a number of times in the literature. Their preparation usually involves in-situ polymerization of individual vinyl monomers or alternatively mixtures thereof using free-radical initiators in polyetherols. The latter are usually products of the addition reaction of alkylene oxides, in particular propylene oxide and ethylene oxide, with OH-functional starting substances. Such processes are described, for example, in DE-B 1 152 536, DE-A 1 955 891, DE-A 2 448 686, DE-B 2 456 682, DE-A 2 505 680,t U.S. Pat. No. 3,418,354, U.S. Pat. No. 3,304,273 and U.S. Pat. No. 3,383,351. The vinyl polymer is essentially a solid and in the present system is the dispersant. The stability of the dispersion is increased by apparent partial grafting of the polyol with vinyl monomers. Of the wide range of vinyl monomers which can be employed, acrylonitrile and styrene, preferably mixtures thereof, are principally used.

For polymer dispersions having low solids contents and styrene:acrylonitrile ratios of about 1:1 or for pure polyacrylonitrile dispersions, stabilization by the abovementioned partial grafting is sufficient. The partial grafting takes place via a hydrogen abstraction mechanism on the tertiary carbon atom of a propylene oxide segment in the polyether chain or by a reaction at double bonds, for example allyl or cis-propenyl groups present in small, but non-negligible amounts in all polyether alcohols prepared from propylene oxide. The grafting starting from the propylene oxide segment is an essential prerequisite for the stability of the dispersion. For this reason, stable polymeric polyols cannot be prepared from pure polyethylene oxides by the abovementioned general process. The demand for highly filled polymer dispersions of increased whiteness has resulted in an increase in the styrene concentration. Since styrene has a low grafting tendency, simple stabilization by grafting to the dispersion medium in not sufficient here; it must be supplemented by the use of specific dispersion aids. The development of highly concentrated polymeric polyols wan the starting point for many patents which claim improvements in the synthesis and properties of polymers. In particular, the increase in the graft polymer content and thus sufficient stabilization of the dispersions is achieved by introducing double bonds, for example by reaction with unsaturated dicarboxylic acids or anhydrides thereof and reaction of the second carboxyl group with ethylene oxide, described in U.S. Pat. No. 4,625,589, by urethanization by means of unsaturated isocyanates, described in U.S. Pat. No. 4,454,255, use of non-aqueous dispersion aide, known as NADs, described in EP-A 162 588 and EP-A 162 589. A specific variant of the increase in the grafting effectiveness is the use of so-called coupled polyola, described in U.S. Pat. No. 4,357,430. Coupled polyols are products of the reaction of polyisocyanate and polyols, here polyetherols containing propylene oxide structures and double bonds, allyl and/or cis-propanyl groups derived therefrom. The increase in molecular weight of the polyetherol due to coupling increases the graft yield for the same grafting rate and thus achieves improved dispersion stabilization.

Most publications hitherto have only mentioned in passing the possibility of employing polyesterols as the dispersion medium. The preparation of polymeric polyols from polyesterols is very complex, since most polyesterols contain no hydrogen atoms bonded to tertiary carbon, which prevents the effective grafting described at the outset and means that the polyesterols have considerably higher viscosities than comparable polyetherols. Due to the considerably higher viscosity of polyesterols compared with polyetherol and the greater problems to be expected in the processing of graft polymerization products prepared therefrom, polymeric polyesterols have hitherto only achieved relatively minor importance in polyurethane chemistry.

In contrast to polyetherol, polyesterols are principally used for shoe soles having improved mechanical properties, for slabstock foam suitable for flame lamination, in compact elastomers or high quality demands, in textile and leather coatings, adhesives, inter alia.

Analogously to polyetherols, it is expected that dispersion of high polymers in polyesterols will improve the service properties.

Stable polyesterol dispersions have hitherto been prepared by carrying out the graft polymerization of vinyl monomer mixtures comprising at least 10% of acrylonitrile or methyl methacrylate and styrene in the presence of unsaturated polyesterol., described in ES 557 716, ES 555 890 and EP-A 250 351. Although the use of unsaturated polyesterols is an effective method for dispersion stabilization, the desired reaction of the double bond of the polyesterol with the monomers is accompanied by additional uncontrolled intermolecular linking of the polyester molecules to one another, which further increases the already high viscosity of the dispersion medium and thus greatly limits the solids content which can be achieved.

The preparation of stable polymeric polyesterols in saturated polyesterols by graft polymerization of acrylonitrile/styrene or methyl methacrylate/styrene in the presence of 5–20% by weight of an emulsifier or stabilizer has also been described (ES 555 780).

These products have very high viscosities, in particular if the acrylonitrile content is high, and have a broad particle size distribution.

For this reason, the preparation of styrene-containing polymeric polyesterol dispersions in the presence of non-aqueous dispersion stabilizers has recently been recommended (J. M. Monso, J. Soler et al., UTECH 92, pp. 150–154). This type of stabilization has the disadvantage of the cost for the preparation of the non-aqueous dispersion stabilizers.

It is an object of the present invention to develop polymeric polyesterols which can be prepared with adequate stability and good processing viscosity by a simple process and can be converted into polyurethane plastics having improved mechanical properties.

We have found that this object is achieved by preparing polymeric polyesterols by in-situ polymerization of vinyl monomers in the presence of initiators which form free radicals, in polyesterols, known as base polyesterols, in the presence of from 0.5 to 30 percent by weight of prepolymers prepared by reacting polyesterols with isocyanates.

The present invention accordingly provides a process for the preparation of polymeric polyesterols by in-situ polymerization of vinyl monomers in the presence of initiators which form free radicals, in polyesterols in the presence of from 0.5 to 30 percent by weight of prepolymers prepared by reacting polyesterols with isocyanates.

The polyesterols used are known products of the polycondensation of conventional di- and polycarboxylic acids or anhydrides thereof with polyhydric alcohols. Preferred polycarboxylic acids are adipic acid, phthalic acid, glutaric acid, oxalic acid, malonic acid, pimelic acid, azelaic acid, sebacic acid, inter alia. It is also possible to use unsaturated dicarboxylic acids, for example maleic acid, but the outlined disadvantages can occur. Examples of polyhydric alcohols are ethylene glycol, diethylene glycol, propylene glycol, dipropylene glycol, 1,3-butanediol, 1,4-butanediol, 1,6-hexanediol, 1,4hexanediol, cyclohexanedimethyl alcohol, propanetriol, trimethylolpropane, trimethylolbutane, pentaerythritol and neopentyl glycol. It is also possible to use derivatives of $\epsilon$-caprolactone. The polyesters are prepared by processes known from the literature by esterification of acid and alcohol components, usually under reduced pressure and using conventional catalysts.

These polyesterols, which may also be referred to as "base polyesterols", will generally have initial viscosities of from 450 to 1,200 mPas at 75° C. Their mean molecular weight will generally be from 1000 to about 2500.

To prepare the prepolymers used according to the invention, polyesterols such as those described above are reacted with conventional isocyanates. The isocyanates used are usually tolylene diisocyanate, diisocyanates from the diphenylmethane series, isophorone diisocyanate, naphthylene 1,5-diisocyanate and hexamethylene 1,6-diisocyanate.

The prepolymer can in principle be prepared using any polyesterol, but it is advantageous to prepare the prepolymer using the same polyesterol used as base polyesterol for the polymer polyol or polymeric polyesterol preparation in order to avoid problems caused by foreign polyesters in the polyurethane preparation. A further advantage is the production of more uniform end products. In the simplest case, the prepolymer is prepared in situ by adding a substoichiometric amount of diisocyanates to the base polyesterol and thus forming the prepolymer in the polyesterol.

However, it is more advantageous to prepare the prepolymer in a separate step before the in-situ polymerization. This procedure allows the mean molecular weight of the polyester prepolymer to be set at defined value through the NCO:OH ratio selected. It is also advantageous here to use a substoichiometric amount of diisocyanates in order to obtain hydroxyl-terminated prepolymers. However, even if the prepolymer were to contain isocyanate terminal groups, these would react with the hydroxyl groups of polyesterol to form urethane groups immediately after addition of the prepolymer to the polyesterol, and a prepolymer containing hydroxyl terminal groups would again be present in the polyesterol.

The prepolymer will generally have a mean molecular weight of from 5000 to 10,000. The mixture of the prepolymer and base polyesterol will have a mean molecular weight of about 3000, generally in the range of from about 2500 to 3500.

In principle, the novel preparation process for the polymeric polyesterols of the invention can be divided into the following steps:

(1) A prepolymer of a polyesterol and a diisocyanate is added proportionately to a base polyesterol; in the simplest case, the prepolymer has been formed in situ by addition of a substoichiometric amount of diisocyanate to this base polyesterol.

(2) Preparation of the polymer polyesterol by in-situ polymerization of olefinically unsaturated monomers in this base polyesterol containing a polyester prepolymer.

The polymeric polyesterols according to the invention are prepared by in-situ polymerization of ethylenically unsaturated monomers, usually(styrene and/or acrylonitrile, mixtures of styrene and acrylonitrile; but also butadiene, 2-methylstyrene and acrylic acid and derivatives thereof, for example methacrylic acid, methyl acrylate, methyl methacrylate, inter alia. Preferred ethylenically unsaturated monomers are those selected from the group consisting of styrene, alpha-methylstyrene, ring substituted styrene, acrylonitrile, methyl(meth) acrylate, ethyl(meth)acrylate and mixtures thereof. The most preferred ethylenically unsaturated monomer is a mixture of styrene and acrylonitrile having at least 80 percent by weight of styrene, based on the monomer weight.

To this end, the base polyesterol maybe first mixed vigorously with a prepolymer. As indicated above, while the prepolymer may be generated in situ in the base polyesterol, it is better to prepare the prepolymer separately and to add it to the polyesterol, since this method allows more precise setting of the molecular weight of the prepolymers and thus of the mean molecular weight of the polyesterol/prepolymer mixture. The monomers, in general together with a free-radical initiator, in an amount of from 0.5 to 5 percent by weight, based on the total monomer content, are added to the mixture of the base polyesterol and prepolymer.

The free-radical initiators used are usually azo compounds, peroxides, perborates, percarbonates, in particular dibenzoyl peroxide or benzoyl hydroperoxide, in an amount of from 0.5 to 5 percent by weight, based on the total monomer content. To improve the handling, it is usual to mix the monomers and the free-radical initiator with base polyesterol and to add this mixture.

The in-situ polymerization is carried out primarily by a batch procedure, usually at from 110° to 150° C., preferably at 130° C., and at atmospheric pressure. The reaction is followed by a post-reaction to complete the monomer conversion and then by vacuum distillation in order to remove unreacted monomers. The resultant products are stable, finely divided dispersions of low viscosity which can be converted into high-quality polyurethane by conventional processing methods. In general, the final viscosities of the polymeric polyesterols of the invention will be less than 6,000 mPas at 75° C.

The fact that the novel procedure is capable of achieving the object of the invention is surprising. In particular, it could not have been expected that the use of fully saturated polyesterols containing no hydrogen atoms bonded to tertiary carbon would enable the prepolymers according to the invention to exert a stabilizing effect. Rather, the person skilled in the art would have feared that the unavoidable increase in viscosity as a consequence of prepolymer formation would hinder the polymeric polyol preparation.

The invention is described by the Examples below.

EXAMPLE 1

2640 g of a polyesterol based on adipic acid/1,4-butanediol and having amean molecular weight of 2400 and 1 g of tin(II) octanoate were introduced into a stirred reactor fitted with an inert-gas inlet, reflux condenser and temperature control means and were warmed to 80° C. with continuous stirring. 250 g of 4,4'-diphenyl-methane diisocyanate were subsequently metered in slowly over the course of 10 minutes. The reaction product was warmed at 120° C. for a further 15 minutes. 456 g of the above polyesterol were added to 24 g of the resultant prepolymer in the above stirred reactor and the mixture was warmed to 130° C. When the reaction temperature had been reached, a mixture of 40 g of styrene, 57 g of the above polyesterol, 5 g of the above prepolymer and 1.65 g of azobisisobutyronitrile were metered in at a uniform rate over the course of 45 minutes with constant stirring. The reaction temperature was kept in the range from 125° to 130° C. during the addition. This was followed by a one hour post-reaction of 130° C. in order to complete the monomer conversion. In order to reduce the amount of free styrene to a minimum level, the mixture was subsequently distilled under reduced pressure at 120° C. The resultant polymeric polyesterol had a hydroxyl number of 40 mg of KOH/g, an acid number of 0.37 mg of KOH/g, a water content of 0.01% by weight, based on the polymeric polyesterol mixture, a viscosity of 2690 mPas at 75° C. and a free styrene content of 0.01 percent by weight, based on the polymeric polyesterol mixture.

EXAMPLE 2

A mixture of 50 g of styrene, 50 g of acrylonitrile, 95 g of the above polyesterol, 5 g of the above prepolymer and 2 g of azobisisobutyronitrile were metered, by the process described in Example 1, into 300 g of the base polyesterol used in Example 1, which contained 5 percent by weight of the prepolymer described in Example 1. After reaction and work-up, a polymeric polyesterol having a hydroxyl number of 36 mg of KOH/g, an acid number of 0.35 mg of KOH/g, a water content of 0.01 percent by weight, based on the polymeric polyesterol mixture, a viscosity of 3600 mPas at 75° C. and a free monomer content of <0.02 percent by weight, based on the polymeric polyesterol mixture, was obtained.

EXAMPLE 3

A prepolymer was prepared by the process described in Example 1 from 3000 g of a polyesterol based on adipic acid, monoethylene glycol and 1,4-butanediol and 250 g of 4,4'-diphenylmethane diisocyanate. 25 g of base polyesterol, and a mixture of 150 g of styrene, 90 g of base polyesterol, 10 g of the above prepolymer and 4.1 g of azobisisobutyronitrile as metered into this mixture as described in Example 1. A polymeric polyesterol having a hydroxyl number of 39 mg of KOH/g, an acid number of 0.2 mg of KOH/g, a water content of 0.02 percent by weight, based on the polymeric polyesterol mixture, a viscosity of 3600 mPas at 75° C. and a free styrene content of <0.02% by weight, based on the polymeric polyesterol mixture, was obtained.

EXAMPLE 4

A prepolymer was prepared by the method described in Example 1 from 1950 g of a polyesterol based on adipic acid, maleic anhydride, monoethylene glycol, diethylene glycol and neopentyl glycol and 131 g of tolylene diisocyanate. 15 g of this polymer were mixed with 135 g of a polyesterol based on adipic acid, monoethylene glycol, diethylene glycol and neopentyl glycol and having a mean molecular weight of 1500, and a mixture of 200 g of styrene, 150 g of the based polyesterol and 4 g of O-t-butyl O-2-ethylhexyl monoperoxycarbonate was metered into this mixture over the course of 45 minutes. After a post-reaction time at 130° C. of 3 hours, a polymeric polyesterol having a residual styrene content of 0.02 percent by weight, based on the polymeric polyesterol mixture, and having a viscosity of 3200 mPas at 75° C., a hydroxyl number of 45 mg of KOH/g, an acid number of 0.3 mg of KOH/g and a water content of 0.04 percent by weight, based on the polymeric polyesterol mixture, was obtained.

The hydroxyl number was in each case determined in accordance with DIN 53 240, the acid number was determined in accordance with DIN 53 402, the water content was determined in accordance with DIN 51 777 and the viscosity was determined in accordance with DIN 53 214. The free monomer contents were determined by gas chromatography.

We claim:

1. A process for the preparation of polymeric polyesterols by in-situ polymerization of ethylenically unsaturated compounds in the presence of free-radical initiators in polyesterols, the process consisting of carrying out in a base polyesterol, the in-situ polymerization of olefinically unsaturated-monomers selected from the group consisting of styrene, acrylonitrile, and mixtures thereof, in the presence of from 0.5 to 30 percent by weight, based on the base polyesterol, of prepolymers prepared by reacting polyesterols with isocyanates.

2. A process as claimed in claim 1, wherein the prepolymers are prepared by reacting base polyesterol with isocyanate.

3. The process of claim 1, wherein the resulting polymeric polyesterol has a final viscosity of less than 6000 mPas at 75° C.

4. A polymeric polyesterol consisting of the reaction product of the in-situ polymerization, in a base polyesterol, of olefinically unsaturated monomers selected from the group consisting of styrene, alpha-methylstyrene, ring substituted styrene, acrylonitrile, methyl(meth)acrylate, ethyl (meth)acrylate and mixtures thereof, in the presence of free radical initiators and from 0.5 to 30 percent by weight, based on the base polyesterol, of prepolymers prepared by reacting polyesterols with isocyanates.

* * * * *